(12) United States Patent
Stoyanov et al.

(10) Patent No.: US 11,859,497 B2
(45) Date of Patent: *Jan. 2, 2024

(54) SEAL SEAT INSERT FOR GAS TURBINE ENGINES

(71) Applicant: RAYTHEON TECHNOLOGIES CORPORATION, Farmington, CT (US)

(72) Inventors: Pantcho P. Stoyanov, West Hartford, CT (US); Eli N. Ross, Vernon, CT (US)

(73) Assignee: RTX Corporation, Farmington, CT (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/706,347

(22) Filed: Mar. 28, 2022

(65) Prior Publication Data

US 2022/0412223 A1 Dec. 29, 2022

Related U.S. Application Data

(63) Continuation of application No. 16/570,072, filed on Sep. 13, 2019, now Pat. No. 11,339,675.

(51) Int. Cl.
*F01D 11/00* (2006.01)
*F01D 25/12* (2006.01)
*F02C 7/20* (2006.01)

(52) U.S. Cl.
CPC .......... *F01D 11/003* (2013.01); *F01D 25/125* (2013.01); *F02C 7/20* (2013.01);
(Continued)

(58) Field of Classification Search
CPC ........ F01D 11/00; F01D 25/00; F01D 25/125; F01D 25/08; F01D 25/12; F01D 11/003;
(Continued)

(56) References Cited

U.S. PATENT DOCUMENTS 3,652,183 A * 3/1972 Pottharst, Jr. .......... F16J 15/348
415/111
3,969,451 A 7/1976 Floyd et al.
(Continued)

FOREIGN PATENT DOCUMENTS

EP 2520835 11/2012

OTHER PUBLICATIONS

USPTO; Supplemental Notice of Allowance dated Apr. 5, 2022 in U.S. Appl. No. 16/570,072.
(Continued)

*Primary Examiner* — Nathan Cumar
(74) *Attorney, Agent, or Firm* — SNELL & WILMER L.L.P.

(57) ABSTRACT

A seal assembly for a gas turbine engine may include a seal body coupled to an engine static structure of the gas turbine engine and a seal seat insert coupled to a radially extending portion of a shaft of the gas turbine engine. The seal body may be generally configured to be biased into contact with the seal seat insert to provide a sealing pressure between the seal body and the seal seat insert. In various embodiments, the seal seat insert is made from a ceramic material or a ceramic matrix composite.

17 Claims, 4 Drawing Sheets

(52) U.S. Cl.
CPC ...... *F05D 2220/32* (2013.01); *F05D 2240/50* (2013.01); *F05D 2240/55* (2013.01); *F05D 2260/36* (2013.01)

(58) Field of Classification Search
CPC .......... F02C 7/00; F02C 7/20; F05D 2220/00; F05D 2220/30; F05D 2220/32; F05D 2220/321; F05D 2220/3212; F05D 2220/3213; F05D 2220/3215; F05D 2220/3216; F05D 2220/3217; F05D 2220/3218; F05D 2220/3219; F05D 2240/00; F05D 2240/50; F05D 2240/51; F05D 2240/511; F05D 2240/515; F05D 2240/55; F05D 2260/00; F05D 2260/30; F05D 2260/36
USPC ........................................................ 277/345
See application file for complete search history.

(56) References Cited

U.S. PATENT DOCUMENTS

| | | | |
|---|---|---|---|
| 4,361,334 A | 11/1982 | Amorese et al. | |
| 6,322,081 B1 * | 11/2001 | Ullah | F16C 33/76 |
| | | | 277/504 |
| 6,371,488 B1 * | 4/2002 | Szymborski | F04D 29/126 |
| | | | 277/358 |
| 8,167,314 B2 | 5/2012 | Ullah | |
| 10,094,233 B2 | 10/2018 | Landwehr et al. | |
| 10,329,951 B2 | 6/2019 | Walker | |
| 2012/0301312 A1 * | 11/2012 | Berczik | F01D 5/284 |
| | | | 29/889.21 |
| 2014/0265151 A1 | 9/2014 | Vasagar | |
| 2016/0222812 A1 * | 8/2016 | Sippel | F01D 11/12 |
| 2017/0030212 A1 * | 2/2017 | Park | F01D 11/08 |
| 2017/0051834 A1 * | 2/2017 | Webster | F16J 15/4472 |
| 2018/0045316 A1 * | 2/2018 | Kovacik | F01D 25/22 |
| 2018/0223690 A1 | 8/2018 | Ullah et al. | |
| 2019/0078688 A1 | 3/2019 | Walker et al. | |

OTHER PUBLICATIONS

USPTO; Supplemental Notice of Allowance dated Apr. 20, 2022 in U.S. Appl. No. 16/570,072.
European Patent Office, European Search Report dated Jan. 26, 2021 in Application No. 20195799.0.
USPTO, PreInterview First Office Action dated Nov. 1, 2021 in U.S. Appl. No. 16/570,072.
USPTO, Notice of Allowance dated Jan. 26, 2022 in U.S. Appl. No. 16/570,072.
European Patent Office, European Office Action dated Nov. 29, 2022 in Application No. 20195799.0.

* cited by examiner

SEAL SEAT INSERT FOR GAS TURBINE ENGINES

CROSS-REFERENCE TO RELATED APPLICATIONS

This application is a continuation of, and claims priority to and the benefit of, U.S. patent application Ser. No. 16/570,072 filed Sep. 13, 2019, and entitled "SEAL SEAT INSERT FOR GAS TURBINE ENGINES," which is incorporated herein by reference in its entirety for all purposes.

FIELD

The present disclosure relates to seal assemblies, and more specifically to a seal seat insert for a seal assembly implemented in a bearing compartment of gas turbine engine.

BACKGROUND

Gas turbine engine typically include a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Shafts coupled between the turbine and compressor sections are supported on bearings disposed within bearing compartments. The bearing compartments are isolated from high pressure and temperature regions within the engine. To maintain the environment within a bearing compartment a seal between a static and rotating part is often employed. Seals are typically biased against a rotating face at a defined pressure to provide the desired seal. Such seals may wear prematurely, causing decreased sealing performance.

SUMMARY

Disclosed herein, according to various embodiments, is a seal assembly for a gas turbine engine. The seal assembly includes a seal body coupled to an engine static structure of the gas turbine engine and a seal seat insert coupled to a shaft of the gas turbine engine, according to various embodiments. The seal body may be generally configured to be biased into contact with the seal seat insert to provide a sealing pressure between the seal body and the seal seat insert. In various embodiments, the seal seat insert is made from a ceramic material or a ceramic matrix composite.

In various embodiments, the seal body contains graphite. In various embodiments, the seal seat insert is made from silicon carbide and/or silicon nitride. The seal seat insert may be retained within a recess defined by the shaft. For example, the seal seat insert may be retained within the recess using an interference fit.

Also disclosed herein, according to various embodiments, is a bearing assembly for a gas turbine engine. The bearing assembly may include an engine static structure, a shaft configured to rotate within the gas turbine engine, and a bearing supporting the shaft relative to the engine static structure. The bearing assembly may further include a seal body coupled to the engine static structure and a seal seat insert coupled to the shaft. The seal body is generally configured to be biased into contact with the seal seat insert to provide a sealing pressure between the seal body and the seal seat insert, according to various embodiments.

In various embodiments, the seal seat insert is made from a ceramic material or a ceramic matrix composite. In various embodiments, the seal body comprises graphite. In various embodiments, the seal seat insert is made from silicon carbide and/or silicon nitride. The seal seat insert may be retained within a recess defined by the shaft. For example, the seal seat insert may be retained within the recess using an interference fit.

In various embodiments, the shaft comprises a radially extending portion, and the recess is defined in the radially extending portion of the shaft. In various embodiments, the recess is defined in an axially aft facing surface of the radially extending portion. In various embodiments, the bearing assembly further includes a seal holder and a biasing member. The seal body may be supported by the seal holder, and the seal holder may be coupled to the engine static structure via the biasing member.

Also disclosed herein, according to various embodiments, is a method of forming a seal between an engine static structure and a shaft of a gas turbine engine. The method may include supporting a seal body on the engine static structure, coupling a seal seat insert to the shaft, and generating a sealing pressure via direct contact between the seal body and the seal seat insert. In various embodiments, coupling the seal seat insert to the shaft comprises retaining the seal seat insert within a recess defined by the shaft. The seal seat insert may be made from at least one of a ceramic material and a ceramic matrix composite.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
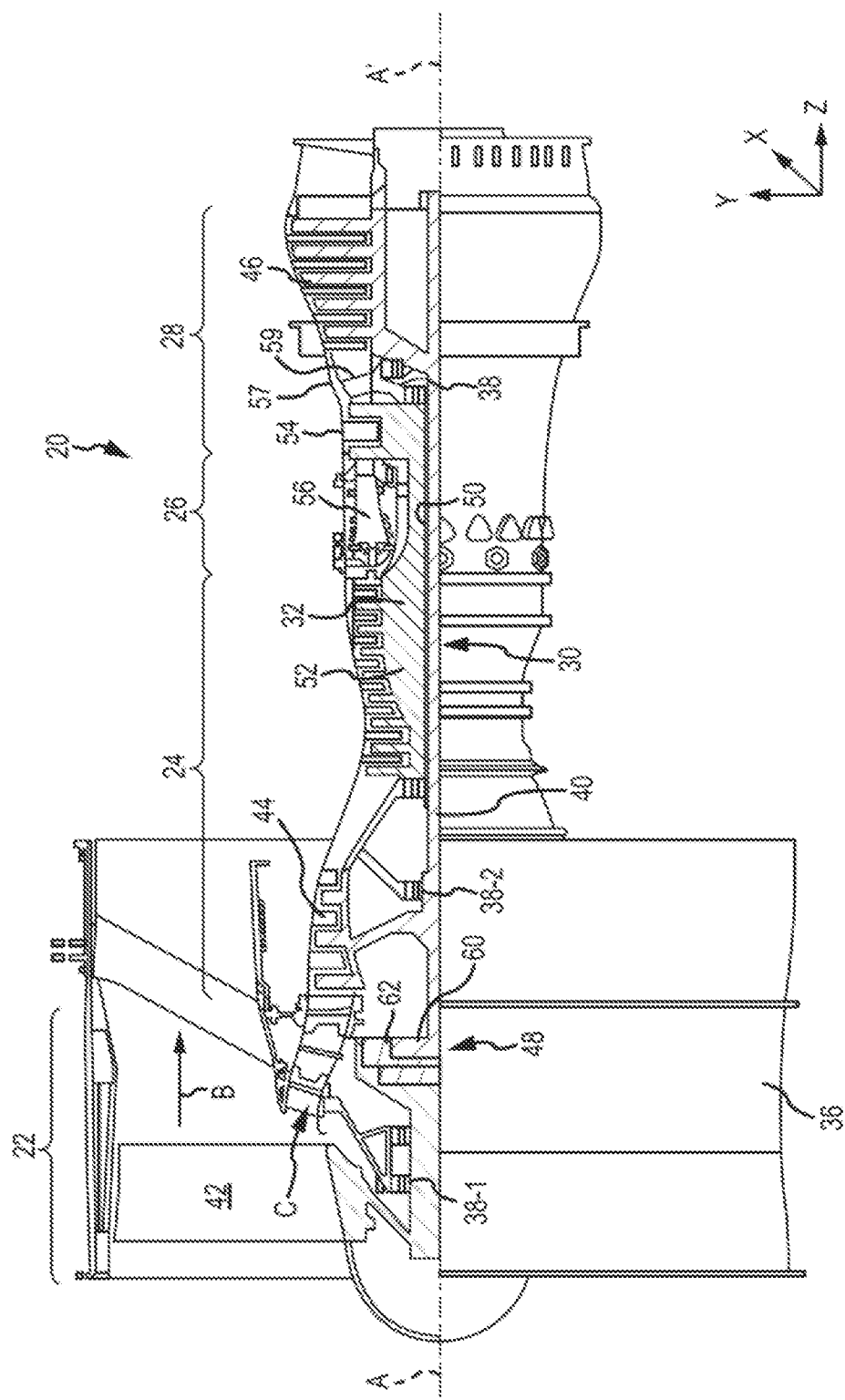
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with the present inventions and the teachings herein. Thus, the detailed description herein is presented for purposes of illustration only and not of limitation. The scope of the present inventions is defined by the appended claims.

Disclosed herein, according to various embodiments, is a seal assembly for gas turbine engines that includes a seal seat insert coupled to the rotating side of the seal assembly. In various embodiments, the seal seat insert provides various benefits over coatings or other applied materials. More specifically, the seal seat insert disclosed herein may inhibit premature wear and may extend/increase sealing performance of the seal assembly. While numerous details are included herein pertaining to assemblies and method pertaining to implementing the seal seat insert in a gas turbine engine, the seal seat insert and the associated methods/systems may be used in other seal assemblies.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. They direction on the provided xyz axis refers to a radial direction, and the x direction on the provided xyz axis refers to a circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
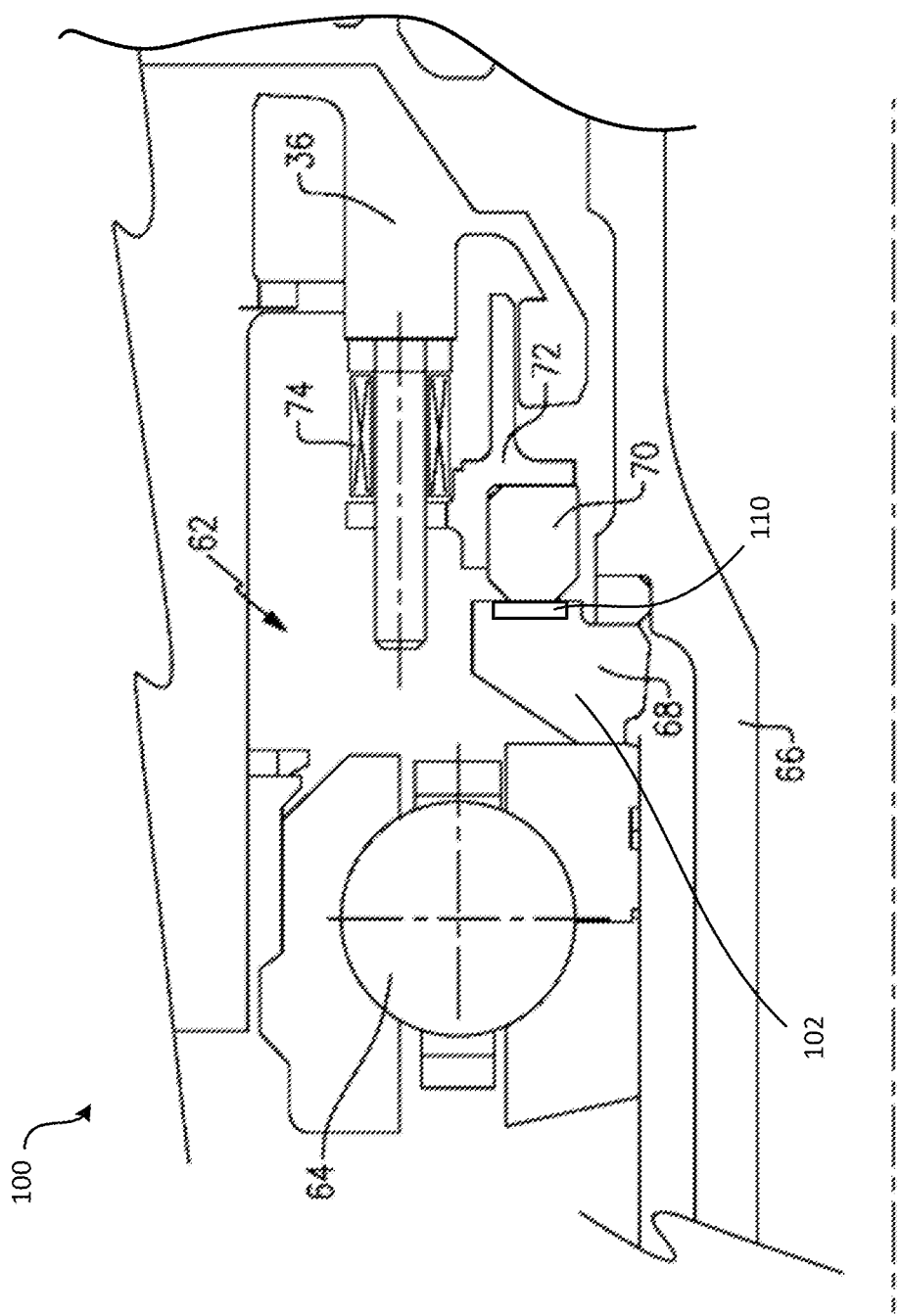
FIG. 2 is a schematic view of a bearing compartment of a gas turbine engine, in accordance with various embodiments.

Referring to FIG. 2, a seal assembly 100 in an exemplary bearing compartment 62 is schematically shown. The bearing compartment 62 includes bearings 64 supporting rotation of a shaft 66, according to various embodiments. The shaft 66 may be one of the inner shaft 40 and outer shaft 50 referenced above, or the shaft 66 may also be any other rotating shaft utilized within a gas turbine engine. A seal seat insert 110 may be coupled to the shaft 66, and a seal body 70 (e.g., a static seal body) may be coupled to an engine static structure 36. The seal body 70 may be configured to be biased into direct contact with the seal seat insert 110 to provide a sealing pressure between the seal body 70 and the seal seat insert 110.

The seal body 70 may be supported on a static structure 36 of the gas turbine engine. For example, the seal body 70 may be supported and/or retained by a seal holder 72, and the seal holder 72 may be coupled to the engine static structure 36 via a biasing member 74. The biasing member 74 may provide force to provide the sealing pressure between the seal body 70 and the seal seat insert 110. In various embodiments, the seal seat insert 110 is coupled to a component 102, such as a radially extending portion 68 of the shaft 66. Said differently, the shaft 66 may include radially extending portion 68, and the seal seat insert 110 may be coupled thereto. The radially extending portion 68 is supported on the rotating shaft 66 such that it rotates relative to the fixed seal body 70, according to various embodiments. The radially extending portion 68 may include a radial surface facing axially aft.

Figure 3:
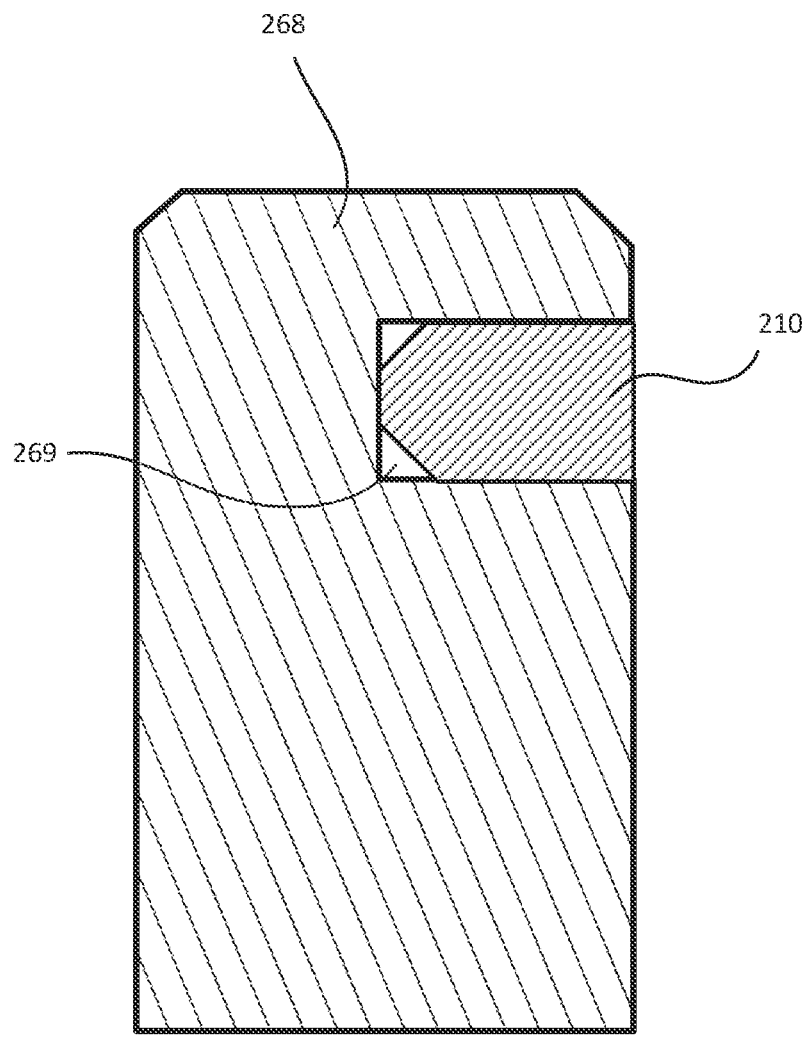
FIG. 3 is a cross-sectional view of a seal seat insert coupled to a shaft of a gas turbine engine, in accordance with various embodiments.

In various embodiments, and with momentary reference to FIG. 3, the radially extending portion 268 of the shaft 66 defines a recess 269, and the seal seat insert 210 is retained at least partially within the recess 269. That is, the seal seat insert 210 may be received within the recess 269 via an interference fit. In various embodiments, the seal seat insert 210 may be retained within the recess 269 or otherwise generally coupled to the shaft 66 using one or more fasteners and/or retention features. In various embodiments, the seal seat insert 210 may be an annular structure that is press fitted within the annular recess 269. In various embodiments, the seal seat insert 210 may be a tight fit against the outer diameter of the recess 269, thus maintaining a proper fit/engagement throughout thermal and centrifugal transient conditions. Further, by so engaging the seal seat insert 210 within the recess 269, the seal seat insert 210 may maintain a favorable compressive stress, the seal seat insert 210 may be protected from damage during installation, and/or may facilitate retention of the seal seat insert 210 within the recess 269 in the event the seal seat insert 210 is fractured. In various embodiments, one or more fasteners disposed in the outer diameter of the recess 269 may be utilized to facilitate retention of the seal seat insert 210.

In various embodiments, and with renewed reference to FIG. 2, the seal body 70 is formed from a carbon material and provides a dry face seal that wears a predictable rate during operation of the gas turbine engine. In various embodiments, the seal body 70 provides sealing of the bearing compartment 62 against the environment surrounding the bearing compartment 62. That is, the biasing member 74 may exert a force on the holder 72 and thereby the seal body 70 is forced against the seal seat insert 110 at a desired pressure. That is, the seal body 70 is a contact face seal, according to various embodiments. The pressure between the seal body 70 and the seal seat insert 110 may be within a desired range such that the seal body 70 and the seal seat insert 110 provide desired sealing performance (e.g., isolation of lubricant in the bearing compartment 62).

The seal body 70 may be made from carbon materials, such as graphite. In various embodiments, the seal seat insert 110 is made from a ceramic material or a ceramic matrix composite. In various embodiments, the seal seat insert 110 is made from silicon carbide and/or silicon nitride. In various embodiments, the seal seat insert 110 comprises a plurality of stacked, layered, and/or wrapped matrix plies and/or weaves. Seal seat insert 110 may be a ceramic matrix composite, such as a silicon-carbide/silicon-carbide matrix, carbon/carbon matrix, carbon/silicon-carbide matrix, alumina matrix, mullite matrix, or a zirconium diboride matrix. In various embodiments, the ceramic matrix composite material may comprise one or more of borides, carbides, oxides, and/or nitrides. In various embodiments the borides may be selected among a group comprising: $ZrB_2$, $HfB_2$, $VB_2$, $TiB_2$, $TaB_2$, TaB, $NbB_2$, NbB, $VB_2$, $TiB_2$, $CrB_2$, $Mo_2B_5$, $W_2B_5$, $Fe_2B$, FeB, $Ni_2B$, NiB, $LaB_6$, CoB, $Co_2B$, or any other refractory boride. In various embodiments, the carbides may be selected among a group comprising: SiC, HfC, ZrC, C, $B_4C$, SiOC, TiC, WC, $Mo_2C$, TaC, NbC, or any other refractory carbide. In various embodiments, the oxides may be selected among a group comprising: $HfO_2$, $ZrO_2$, $Al_2O_3$, $SiO_2$, class compositions including aluminosilicates, borosilicates, lithium aluminosilicates (LAS), magnesium aluminosilicates, barium magnesium aluminosilicates (BMAS), calcium aluminosilicates and other silica containing high temperature glasses, and/or other mixed metal oxides. In various embodiments, the nitrides may be selected among a group comprising: AlN, $Si_3N_4$, TaN, TiN, TiAlN, $W_2N$, WN, $WN_2$, VN, ZrN, BN, HfN, NbN, or any other refractory nitrides. In various embodiments, the CMC material may comprise mixed refractory nonoxides such as, for example, SiCN.

With the seal seat insert 110 being formed of a ceramic or ceramic matrix composite material, the life of the seal assembly is improved. That is, because the seal seat insert 110 is thicker than, a conventional wear coating, the seal assembly 100 has an improved wear life because the seal seat insert 110 may be less susceptible to cracking and/or particle liberation, according to various embodiments. In various embodiments, the seal seat insert 110 is configured to operate effectively as a seal counterface at temperatures from about −40 degrees Fahrenheit (about 93 degrees Celsius) to about 350 degrees Fahrenheit (about 177 degrees Celsius). As used herein, the term "about" refers to plus or minus 5% of the indicated value. The interface between the seal seat insert 110 and the seal body 70 may generate substantial friction heat during operation of the gas turbine engine, and the ceramic/ceramic matrix composite may be well-suited for the operational temperatures.

Figure 4:
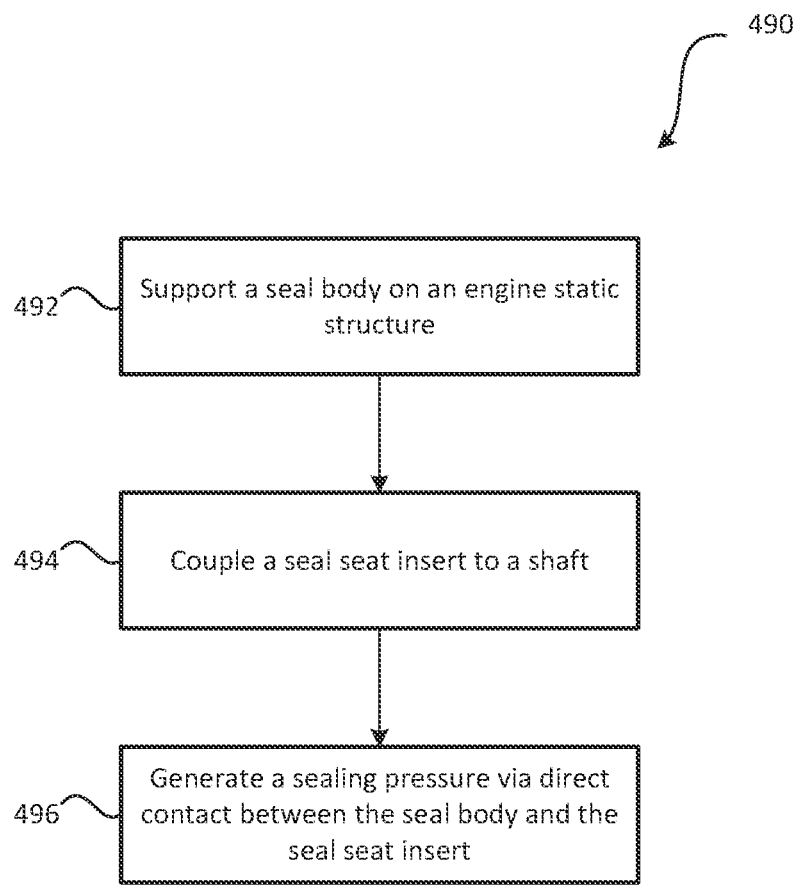
FIG. 4 is a schematic flow chart diagram of a method of forming a seal between an engine static structure and a shaft of a gas turbine engine, in accordance with various embodiments.

In various embodiments, and with reference to FIG. 4, a method 490 of forming a seal between an engine static structure and a shaft of a gas turbine engine is provided. The method 490 may include supporting a seal body on the engine static structure at step 492, coupling a seal seat insert to the shaft at step 494, and generating a sealing pressure via direct contact between the seal body and the seal seat insert at step 496. In various embodiments, coupling the seal seat insert to the shaft at step 494 comprises retaining the seal seat insert within a recess defined by the shaft. In various embodiments, step 494 may include heating the shaft to open/enlarge the recess to allow for insertion of the seal seat insert. Upon cooling, the seal seat insert may be retained within the recess with a tight fit. For example, the seal seat insert may be an annular structure, and the seal seat insert may be moved axially to be received into an annular recess defined by the shaft (e.g., a radially extending portion of the shaft). The seal seat insert may be made from at least one of a ceramic material and a ceramic matrix composite. In various embodiments, the seal seat insert is installed so as to be flush with the radially extending portion within which the seal seat insert is retained. Accordingly, the method may include polishing or otherwise grinding the seal seat insert to make the sealing interface surface flush with the radially extending portion.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly for a gas turbine engine, the seal assembly comprising:
    a seal body coupled to an engine static structure of the gas turbine engine; and
    a seal seat insert coupled to a radially extending portion of a component of the gas turbine engine;
    wherein the seal body is configured to be biased into contact with the seal seat insert to provide a sealing pressure between the seal body and the seal seat insert,
    wherein the seal seat insert is made from a ceramic matrix composite including at least one of silicon carbide and silicon nitride, and
    wherein the radially extending portion of the component directly contacts around the seal seat insert.

2. The seal assembly of claim 1, wherein the seal seat insert is made from a ceramic material.

3. The seal assembly of claim 1, wherein the seal body contains graphite.

4. The seal assembly of claim 1, wherein the seal seat insert is retained within a recess defined by the radially extending portion of the component.

5. The seal assembly of claim 4, wherein the seal seat insert is retained within the recess using an interference fit.

6. A bearing assembly for a gas turbine engine comprising:
    an engine static structure;
    a shaft configured to rotate within the gas turbine engine;
    a bearing supporting the shaft relative to the engine static structure;
    a seal body; and
    a seal seat insert;
    wherein the seal body is configured to be biased into contact with the seal seat insert to provide a sealing pressure between the seal body and the seal seat insert,
    wherein the seal seat insert is made from at least one of silicon carbide and silicon nitride, and
    wherein a component directly contacts around the seal seat insert.

7. The bearing assembly of claim 6, wherein the seal seat insert is made from a ceramic material.

8. The bearing assembly of claim 6, wherein the seal seat insert is made from a ceramic matrix composite.

9. The bearing assembly of claim 8, wherein the seal body contains graphite.

10. The bearing assembly of claim 6, wherein the seal seat insert is made from at least one of silicon carbide and silicon nitride.

11. The bearing assembly of claim 6, wherein the seal seat insert is retained within a recess defined by the radially extending portion of the shaft.

12. The bearing assembly of claim 11, wherein the seal seat insert is retained within the recess using an interference fit.

13. The bearing assembly of claim 12, wherein the radially extending portion is attached to the shaft, wherein the recess is defined in the radially extending portion of the shaft.

14. The bearing assembly of claim 13, wherein the recess is defined in an axially aft facing surface of the radially extending portion.

15. The bearing assembly of claim 6, further comprising a seal holder and a biasing member, wherein the seal body is supported by the seal holder, and the seal holder is coupled to the engine static structure via the biasing member.

16. A method of forming a seal between an engine static structure and a component of a gas turbine engine, the method comprising:
    supporting a seal body;
    coupling a seal seat insert to a component; and generating a sealing pressure via direct contact between the seal body and the seal seat insert, wherein coupling the seal seat insert to the component comprises retaining the seal seat insert within a recess defined by the component, and
wherein the component directly contacts around the seal seat insert.

17. The method of claim 16, wherein the seal seat insert is made from at least one of a ceramic material and a ceramic matrix composite material.

* * * * *